United States Patent
Böhm et al.

Patent Number: 5,697,069
Date of Patent: Dec. 9, 1997

[54] TRANSMIT-RECEIVER SWITCH

[75] Inventors: Konrad Böhm, Blaustein; Rainer Götzfried; Johann-Friedrich Luy, both of Ulm, all of Germany

[73] Assignee: Daimler-Benz Aktiengesellschaft, Stuttgart, Germany

[21] Appl. No.: 726,421

[22] Filed: Oct. 7, 1996

[30] Foreign Application Priority Data

Oct. 5, 1995 [DE] Germany ............ 195 37 022.8

[51] Int. Cl.$^6$ ............................................ H04B 1/48
[52] U.S. Cl. .................... 455/83; 327/405; 333/103
[58] Field of Search ............................ 333/103, 104; 327/405, 411, 417, 432; 455/78, 80, 82, 83

[56] References Cited

FOREIGN PATENT DOCUMENTS

| 0 151 014 | 1/1985 | European Pat. Off. . |
| 23 62 889 | 12/1973 | Germany . |
| 43 43 719 | 12/1993 | Germany . |
| 6-232601 | 8/1994 | Japan .................... 333/104 |

*Primary Examiner*—Paul Gensler
*Attorney, Agent, or Firm*—Spencer & Frank

[57] ABSTRACT

A transmit-receive switch which can be integrated. The receive diplexer of the switch comprises a parallel resonant circuit which can be completed or connected into the switch via a heterobipolar transistor. The transmit diplexer includes a series resonant circuit or a parallel resonant circuit which is connected into the switch circuit via a further heterobipolar transistor. Each of the heterobipolar transistors is rendered conductive or non-conductive via the applied HF power. That is, a high HF power, as is present in the transmission case, causes the respective transistor to become conductive and via the respective resonant circuits, cause the receive diplexer to become high impedance and block any signal, and cause the transmit diplexer to become low impedance and pass the high HF power substantially undampened. Conversely if the power is low, as is present in the reception case, the respective transistors become blocking and via the respective resonant circuits cause the receiver diplexer to become low impedance and conduct the received energy substantially undampened to a receiver, and cause the transmit diplexer to block the passage of the received power to a transmitter.

18 Claims, 2 Drawing Sheets

TRANSMIT-RECEIVER SWITCH

REFERENCE TO RELATED APPLICATIONS

This application claims the priority of German application Ser. No. 19537022.8, filed Oct. 5, 1995, which is incorporated herein by reference.

BACKGROUND OF THE INVENTION

The invention relates to a novel transmit-receive switch that can be switched via resonant circuits in the transmit and receive legs, and to a circuit arrangement for the transmission and reception of power using the transmit-receive switch.

The invention is applied, inter alia, in communication systems for the fabrication of front-ends which can be monolithically integrated.

Presently, p-i-n diodes or MESFETs are used as switches which are fabricated from III/V-semiconductor compounds because of the improved switch properties. Silicon-based p-i-n diodes are also known, but they require a high current and cannot be integrated into CMOS or SiGe processes.

It is therefore the object of the invention to provide a transmit-receive switch which, in the transmission case, has a low insertion loss between power amplifier and antenna and a high isolation between receive diplexer and transmit diplexer. In the reception case, the switch is intended to have a low insertion loss between antenna and receiving mixer and a high impedance in the transmit leg.

SUMMARY OF THE INVENTION

The above object is achieved according to the present invention by a transmit-receive switch which can be switched via resonant circuits in the respective transmit and receive legs, which switch comprises: a first terminal connectible to an antenna, a second receiver terminal and a third transmit terminal; a receive diplexer connected between the first and second terminals and having a parallel resonant circuit; a transmit diplexer connected between the first and third terminals, and having a series resonant circuit or a parallel resonant circuit; and, a respective heterobipolar transistor for each of the resonant circuits for switching the respective resonant circuit on and off in response to applied signals at one of said terminals.

According to preferred features of the invention, each of the heterobipolar transistors is constructed of Si and Ge, and the switch is fabricated with Si-technology and is monolithically integrated into a front-end of a communication system.

According to the preferred embodiment of the invention, the parallel resonant circuit of the receive diplexer is connected between the first and second terminals, with the associated respective transistor being connected in series with the capacitor of the parallel resonant circuit, the resonant circuit of the transmit diplexer is a series resonant circuit connected between ground and the third terminal, and the associated respective transistor is connected in series with a further capacitor of the same value as the capacitor of the series resonant circuit, with the series connection of the transistor and the further capacitor being connected in parallel with the inductor of the series resonant circuit. Preferably the transmit diplexer also contains a λ/4 transmission line connected between the first and third terminals.

According to a modification, the resonant circuit of said transmit diplexer is a parallel resonant circuit connected between the first and third terminals and the associated respective transistor is connected in parallel with the parallel resonant circuit of the transmit diplexer.

The invention offers the advantage that a high power passes through the heterobipolar transistor almost undampened. Therefore, the switch does not have to be changed over from the transmitting to the receiving state since the signals are separated based on their power.

Furthermore, it is advantageous that the monolithic integration of the switch function together with power amplifiers and mixer functions can be carried out in Si-technology because of the use of an Si-based heterobipolar transistor.

The invention is described by way of embodiments with reference to schematic drawings.

DETAILED DESCRIPTION OF THE PREFERRED EMBODIMENTS

Figure 1:
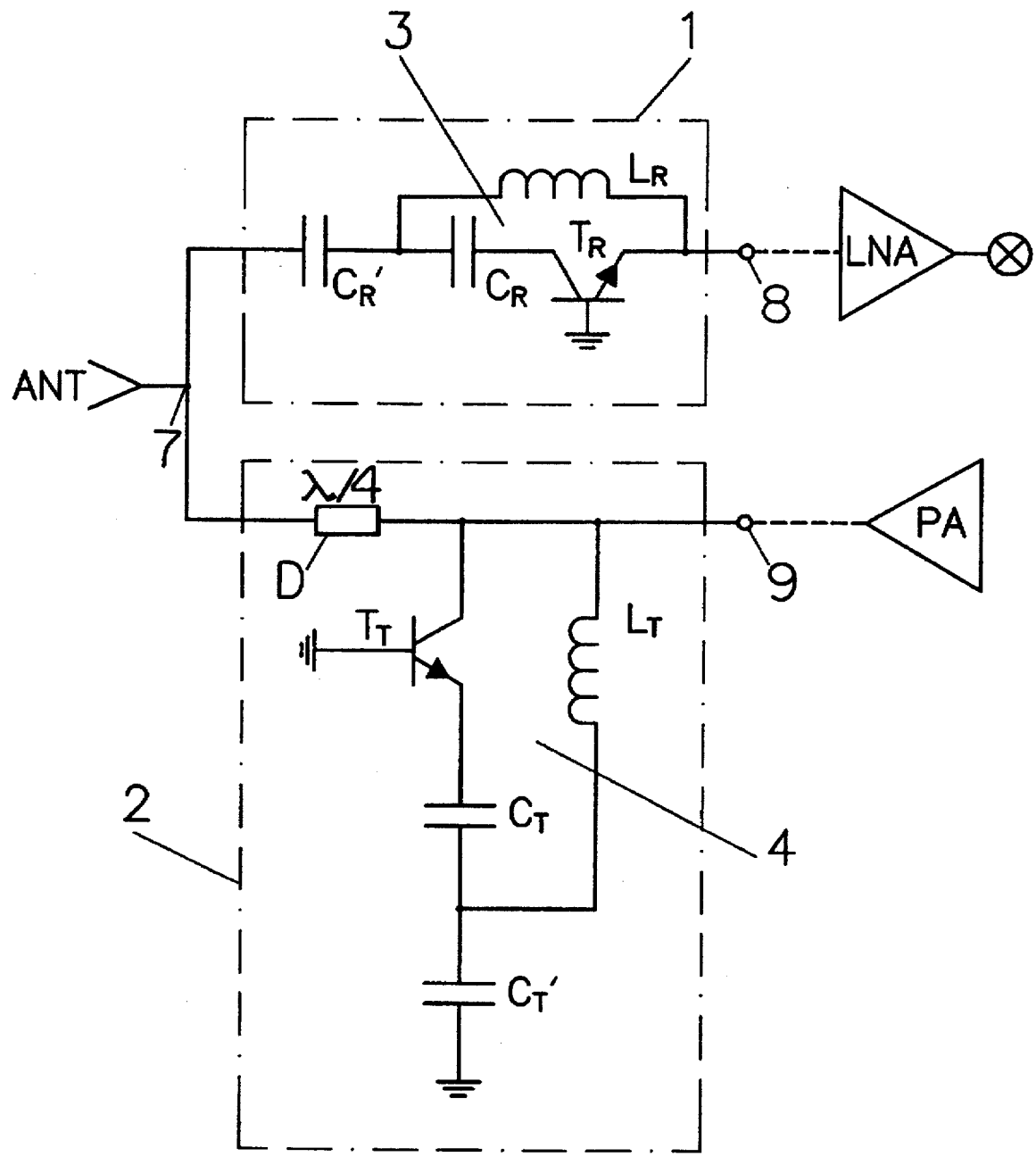
FIG. 1 is a schematic circuit diagram of a preferred embodiment of a transmit-receive switch according to the invention.

FIG. 1 is a schematic circuit diagram of a transmit-receive switch, for example, for a front end of a transceiver, having three terminals 7, 8, and 9, and including a receive diplexer 1 connected between the first terminal 7 and the second terminal 8, and a transmit diplexer 2 connected between the first and third terminals. The first terminal 7 is connectible to an antenna ANT, the second terminal is connectible, for example, to the input of a low noise amplifier LNA and the terminal 9 is connectible, for example, to the output of a power amplifier PA. The receive diplexer 1 comprises a parallel resonant circuit 3 having an inductor $L_R$ and a capacitor $C_R$ as well as a heterobipolar transistor $T_R$ as a switch, with the transistor $T_r$ being connected in a common base configuration and in series with the capacitor $C_R$ of the parallel resonant circuit 3. The parallel resonant circuit 3 is connected to the terminal 7, which is connected to the antenna ANT. This connection to the antenna preferably, as shown, is via a further capacitor $C'_R$ of the same value as the capacitor $C_R$ of the parallel resonant circuit 3, and thus forms a series resonant circuit with inductor $L_R$ when the transistor $T_R$ is not conducting.

The transmit diplexer 2 comprises a series resonant circuit 4 having an inductor $L_T$ and a capacitor $C'_T$ connected between terminal 9 and ground as well as a heterobipolar transistor $T_T$ as a switch. The transistor switch $T_T$ is connected, in a common base configuration, in series with a further capacitor $C_T$ of the same value as the capacitor $C'_T$, with this series connection being connected across (in parallel with) the inductor $L_T$. Preferably the transmit diplexer 2 also includes a λ/4 transmission line D connected between terminal 7 and the series resonant circuit 4, i.e., terminal 9.

In the transmission case, a high HF power, e.g., 1 W(30 dBm), leaves the power amplifier PA. The heterobipolar transistor $T_T$ becomes conductive, or switched through, due to the high HF power, since a high HF power leaves the transistor $T_T$ almost undampened. The series resonant circuit 4, and in particular the inductor $L_T$, is bridged by the conductive transistor $T_T$, thus forming a parallel resonant circuit $L_T C_T$ with a high impedance to ground instead of the low-impedance to ground formed by the series resonant circuit 4. The impedance of the series resonant circuit is determined by the impedance of the inductor $L_T$. Therefore, the value of $L_T$ is designed such that the value of $$L_T >> \frac{\text{antenna impedance}}{\omega}$$

and such that all power goes to the antenna ANT. The value of $L_T$, for example, amounts to 13 nH.

In the receive diplexer 1, the heterobipolar transistor $T_R$ is also conductive in the transmission case, i.e., the parallel resonant circuit is in operation, thus providing a high impedance, and the transmission power does not reach terminal 8 or the input of the low-noise preamplifier LNA.

In the reception case, a low HF power, for example <1 μW, comes from the antenna ANT. There is no HF power coming from the power amplifier PA at this time.

In such case, the heterobipolar transistors $T_R$ and $T_T$ are blocked because of the low power. In the transmit diplexer 2, the series resonant circuit 4 is thus effective and leads to the desired low impedance to ground which can almost be considered to be a short circuit. Accordingly the λ/4 transmission line preferably is provided to transform the "short circuit" into a high impedance at the antenna and thus reduce losses of the received signal. Almost no receiving power is absorbed in the transmit diplexer 2.

During reception, the parallel resonant circuit 3 does not act in the receive diplexer i since the transistor $T_R$ is blocking. The receiving power thus can get into the preamplifier LNA via $L_R$ and then to a mixer. The value of inductor $L_R$ is selected such that the value of $$L_R < \frac{\text{input impedance LNA}}{\omega}$$

and, for example, amounts to 25 nH. Although not actually needed, the additional capacitor $C'_R$ preferably is provided to form a series resonant circuit with the inductor $L_R$ in the reception state in order to provide the advantages of less damping of the weak received signal and of a frequency selective effect.

Figure 2:
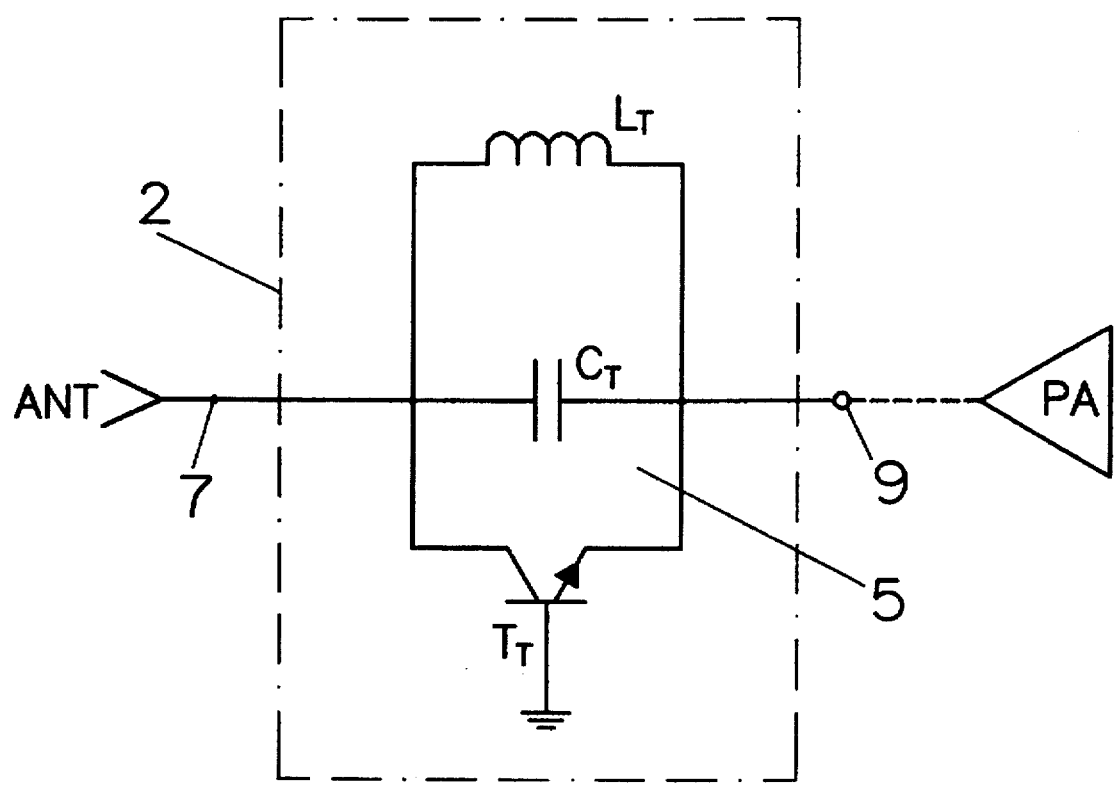
FIG. 2 is a schematic circuit diagram of a modification of the transmit diplexer of FIG. 1.

FIG. 2 illustrates a further embodiment for a transmit diplexer 2. The transmit diplexer 2, in this instance, comprises a parallel resonant circuit 5 with the inductor $L_T$ and the capacitor $C_T$ as well as a heterobipolar transistor $T_T$ all connected in parallel with one another. In the transmission case, high power comes from the power amplifier PA, which power passes through the conductive transistor $T_T$ almost undampened and reaches the antenna ANT. In the reception case, the transistor $T_T$ is blocking due to the low power coming from the antenna ANT. The parallel resonant circuit 5 is then no longer bridged by the conductive transistor $T_T$ and the high impedance value $L_T$ takes effect so that almost no receiving power is absorbed in the transmit diplexer 2.

Each of the heterobipolar transistors $T_R$ and $T_T$ is made of silicon and germanium. Preferably, an Si/SiGe heterobipolar transistor is used which, for example, for low HF powers (up to 10 dBm) has an isolation in the cut-off mode of approx. 30 dB and a damping at saturation of less than 1.5 dB.

The switch according to the invention can be fabricated with Si-technology and can be integrated monolithically together with power amplifiers, mixers and Si-based low-noise preamplifiers. Thus, entirely monolithically integratable front-ends for transceivers can be made with Si-technology. The invention now being fully described, it will be apparent to one of ordinary skill in the art that any changes and modifications can be made thereto without departing from the spirit or scope of the invention as set forth herein.

What is claimed:

1. A transmit-receive switch which can be switched via resonant circuits in the respective transmit and receive legs, said switch comprising;
   a first terminal connectible to an antenna, a second terminal connectible to a receiver and a third terminal connectible to a transmitter;
   a receive diplexer having a parallel resonant circuit connected between the first and second terminals;
   a transmit diplexer connected between the first and third terminals and having a series resonant circuit or parallel resonant circuit; and
   a respective heterobipolar transistor for each of the resonant circuits for switching the respective resonant circuit on and off in response to applied signals at one of said first and third terminals.

2. A transmit-receive switch according to claim 1, wherein each of the heterobipolar transistors is constructed of Si and Ge.

3. A transmit-receive switch according to claim 2, wherein the switch is fabricated with Si-technology and is monolithically integrated into a front-end of a communication system.

4. A transmit-receive switch as defined in claim 1 wherein said parallel resonant circuit of said receive diplexer is connected between said first and second terminals, with the associated respective said transistor being connected in series with a capacitor of the parallel resonant circuit.

5. A transmit-receive switch as defined in claim 4 wherein said resonant circuit of said transmit diplexer is a series LC resonant circuit connected between ground and said third terminal, and the associated respective said transistor is connected in series with a further capacitor of the same value as the capacitor C of the series resonant circuit, with the series connection of the transistor and the further capacitor being connected in parallel with the inductor of said series resonant circuit.

6. A transmit-receive switch as defined in claim 5 wherein said transmit diplexer further includes a λ/4 transmission line connected between said first and third terminal.

7. A transmit receive switch as defined in claim 4 wherein said resonant circuit of said transmit diplexer is a parallel resonant circuit connected between said first and third terminals and the associated respective transistor is connected in parallel with said parallel resonant circuit of the transmit diplexer.

8. A transmit-receive switch as defined in claim 1 wherein said resonant circuit of said transmit diplexer is a series LC resonant circuit connected between ground and said third terminal, and the associated respective said transistor is connected in series with a further capacitor of the same value as the capacitor C of the series resonant circuit, with the series connection of the transistor and the further capacitor being connected in parallel with the inductor of said series resonant circuit.

9. A transmit-receive switch as defined in claim 8 wherein said transmit diplexer further includes a λ/4 transmission line connected between said first and third terminal.

10. A transmit receive switch as defined in claim 1 wherein said resonant circuit of said transmit diplexer is a parallel resonant circuit connected between said first and third terminals and the associated respective transistor is connected in parallel with said parallel resonant circuit of the transmit diplexer.

11. A circuit arrangement for transmission of a signal having a transmit-receive switch according to claim 1, wherein:

a power amplifier for generating a high HF power is connected to said third terminal for feeding the high HF power to the transmit diplexer;

the heterobipolar transistor of the transmit diplexer is connected to become conductive upon receipt of the high power by the transmit diplexer;

the resonant circuit of the transmit diplexer is designed such that the impedance of the resonant circuit of the transmit diplexer is determined by the value of its inductance which impedance becomes fully effective when the associated transistor becomes conductive so that almost all of the generated HF power received at said third terminal is fed to the first terminal for an antenna; and the heterobipolar transistor in the receive diplexer becomes conductive because of the high power and, simultaneously, completes the parallel resonant circuit of the receive diplexer to cause same to present a high impedance so that almost no transmission power is transmitted to a low-noise preamplifier of a receiver connected to said second terminal.

12. A transmit-receive switch as defined in claim 11 wherein said parallel resonant circuit of said receive diplexer is connected between said first and second terminals, with the associated respective said transistor being connected in series with a capacitor of the parallel resonant circuit.

13. A transmit-receive switch as defined in claim 11 wherein said resonant circuit of said transmit diplexer is a series LC resonant circuit connected between ground and said third terminal, and the associated respective said transistor is connected in series with a further capacitor of the same value as the capacitor C of the series resonant circuit, with the series connection of the transistor and the further capacitor being connected in parallel with the inductor of said series resonant circuit.

14. A transmit receive switch as defined in claim 11 wherein said resonant circuit of said transmit diplexer is a parallel resonant circuit connected between said first and third terminals and the associated respective transistor is connected in parallel with said parallel resonant circuit of the transmit diplexer.

15. A circuit arrangement for reception of a signal having a transmit-receive switch according to claim 1 wherein:

an antenna is connected to the first terminal for feeding a low HF power to the transmit-receive switch;

the heterobipolar transistor in the transmit diplexer is connected to become blocking because of the received low power, causing the associated resonant circuit to resonant and provide a low impedance to ground, so that almost no power is absorbed in the transmit diplexer circuit because of the low impedance of the resonant circuit; and the heterobipolar transistor in the receive diplexer is connected to become blocking because of the low received power, thereby deactivating the parallel resonant circuit to cause the receiving power to be fed via an inductor of the parallel resonant circuit to a low-noise preamplifier of a receiver connected to said second terminal.

16. A transmit-receive switch as defined in claim 15 wherein said parallel resonant circuit of said receive diplexer is connected between said first and second terminals, with the associated respective said transistor being connected in series with a capacitor of the parallel resonant circuit.

17. A transmit-receive switch as defined in claim 15 wherein said resonant circuit of said transmit diplexer is a series LC resonant circuit connected between ground and said third terminal, and the associated respective said transistor is connected in series with a further capacitor of the same value as the capacitor C of the series resonant circuit, with the series connection of the transistor and the further capacitor being connected in parallel with the inductor of said series resonant circuit.

18. A transmit receive switch as defined in claim 15 wherein said resonant circuit of said transmit diplexer is a parallel resonant circuit connected between said first and third terminals and the associated respective transistor is connected in parallel with said parallel resonant circuit of the transmit diplexer.

* * * * *